United States Patent
Wehrwein et al.

(10) Patent No.: US 8,939,240 B2
(45) Date of Patent: Jan. 27, 2015

(54) ENGINE ACCESSORY DRIVE SYSTEM

(71) Applicants: Christopher G. Wehrwein, Little Elm, TX (US); William C. Kahn, Denton, TX (US)

(72) Inventors: Christopher G. Wehrwein, Little Elm, TX (US); William C. Kahn, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/782,846

(22) Filed: Mar. 1, 2013

(65) Prior Publication Data

US 2014/0248992 A1 Sep. 4, 2014

(51) Int. Cl.
| | |
|---|---|
| *B60K 25/00* | (2006.01) |
| *B60K 17/28* | (2006.01) |
| *B60K 6/42* | (2007.10) |
| *B60W 20/00* | (2006.01) |
| *B60W 10/30* | (2006.01) |
| *B60W 10/04* | (2006.01) |

(52) U.S. Cl.
CPC ............... *B60W 10/30* (2013.01); *B60W 10/04* (2013.01)
USPC .... 180/53.5; 180/53.8; 180/65.22; 180/65.27

(58) Field of Classification Search
USPC ........ 123/198 R–198 P; 180/53.5, 53.8, 65.1, 180/65.21, 65.22, 65.265–65.285; 474/87
See application file for complete search history.

(56) References Cited

U.S. PATENT DOCUMENTS

| | | | | |
|---|---|---|---|---|
| 2,789,234 A | * | 4/1957 | Davies et al. | 290/1 R |
| 2,910,891 A | * | 11/1959 | Heckethorn | 474/86 |
| 4,662,861 A | * | 5/1987 | Seung et al. | 474/86 |
| 4,756,359 A | * | 7/1988 | Greer | 165/43 |
| 4,762,170 A | * | 8/1988 | Nijjar et al. | 165/43 |
| 5,301,645 A | * | 4/1994 | Ball et al. | 123/198 R |
| 5,333,678 A | * | 8/1994 | Mellum et al. | 165/42 |
| 5,827,143 A | | 10/1998 | Monahan | |
| 5,942,862 A | * | 8/1999 | Yamada et al. | 318/9 |
| 6,048,288 A | * | 4/2000 | Tsujii et al. | 477/5 |
| 6,524,218 B1 | * | 2/2003 | Yamada et al. | 477/5 |
| 6,756,693 B2 | * | 6/2004 | Kennedy | 290/1 A |
| 6,793,059 B2 | * | 9/2004 | Okada et al. | 192/84.1 |
| 7,034,410 B2 | * | 4/2006 | Kennedy | 290/1 A |

(Continued)

FOREIGN PATENT DOCUMENTS

| | | | | | |
|---|---|---|---|---|---|
| JP | 11098601 A | * | 4/1999 | | B60L 1/00 |
| JP | 2001298803 A | * | 10/2001 | | B60L 11/12 |

OTHER PUBLICATIONS

Society of Automobile Engineers (SAE) Papers; <http://www.sae.org/servlets/product?PROD_TYP=PAPER&PARENT_BPA_CD=GV&TE> [retrieved Aug. 11, 2011], 137 pages.

(Continued)

*Primary Examiner* — Ruth Ilan
*Assistant Examiner* — Laura Freedman
(74) *Attorney, Agent, or Firm* — Christensen O'Connor Johnson Kindness PLLC

(57) ABSTRACT

An electrified engine accessory drive (EEAD) system is provided that replaces the front engine accessory drive (FEAD) components (e.g., a/c compressor, air brake compressor; power steering pump, etc.) on vehicles, such as heavy duty trucks. Using such an EEAD system aims to reduce parasitic losses induced on a conventional engine by the front engine accessory drive (FEAD) while providing additional benefits, such as engine off vehicle and/or system operation. The EEAD systems may also be used in lieu of rear-end accessory drives and other accessory drives powering multiple accessories from a common driveshaft.

20 Claims, 4 Drawing Sheets

(56) References Cited

U.S. PATENT DOCUMENTS

| | | | |
|---|---|---|---|
| 7,259,469 B2* | 8/2007 | Brummett et al. | 290/40 C |
| 7,308,883 B2* | 12/2007 | Suzuki | 123/198 R |
| 7,552,708 B2 | 6/2009 | Serkh | |
| 7,582,034 B2* | 9/2009 | Usoro | 475/5 |
| 7,582,978 B2* | 9/2009 | Flanigan et al. | 290/1 A |
| 7,600,381 B2 | 10/2009 | Verbrugge | |
| 7,695,400 B2 | 4/2010 | McGee | |
| 7,726,275 B2* | 6/2010 | Deniston et al. | 123/198 R |
| 7,748,482 B2* | 7/2010 | Holmes et al. | 180/65.22 |
| 7,874,951 B2 | 1/2011 | Leiss | |
| 7,954,580 B2* | 6/2011 | Usoro | 180/65.275 |
| 8,166,945 B2* | 5/2012 | Spicer et al. | 123/179.28 |
| 2002/0039945 A1 | 4/2002 | Ali | |
| 2003/0070849 A1* | 4/2003 | Whittaker | 180/68.2 |
| 2006/0107920 A1 | 5/2006 | Serkh | |
| 2007/0130950 A1* | 6/2007 | Serkh et al. | 60/698 |
| 2008/0248907 A1 | 10/2008 | Cottrell | |
| 2009/0195203 A1 | 8/2009 | Yurgil | |
| 2010/0050671 A1* | 3/2010 | Kahn et al. | 62/190 |
| 2010/0065001 A1 | 3/2010 | Spicer | |
| 2012/0167857 A1* | 7/2012 | Barnes et al. | 123/198 R |
| 2012/0266701 A1* | 10/2012 | Yamada et al. | 74/15.82 |

OTHER PUBLICATIONS

NTN Technical Review—Special Issue: Automotive Environmental Technologies, No. 75, Oct. 2007, 165 pages.

* cited by examiner

ENGINE ACCESSORY DRIVE SYSTEM

BACKGROUND

Numerous means have been sought to improve the fuel-efficiency of vehicles. In the field of surface transportation, and particularly in the long-haul trucking industry, even small improvements in fuel efficiency can reduce annual operating costs significantly.

In vehicles from automobiles through Class 8 trucks, front-end accessory drives (FEAD) are used to power vehicle accessories. These accessories may include a power steering pump, a water pump, an alternator, an air conditioning compressor, an air compressor, a power-take off (PTO) drive, etc. Typically, each of the accessories is driven by a single serpentine belt operatively coupled to the engine. As known in the industry, the accessories driven by the FEAD consume power that could otherwise be directed to propulsion of the vehicle, thereby affecting fuel economy.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a vehicle is provided. The vehicle includes a driveline having a drive shaft and at least one driven wheel, a prime mover configured to provide power to the driveline to provide motive force to the vehicle, a plurality of vehicle accessory components; and an accessory drive unit disposed a spaced distance from the prime mover and discrete therefrom.

In some embodiments, the accessory drive unit comprises an electric motor, a transmission coupled between the electric motor and the plurality of accessory components in order to transfer the output of the electric motor to the plurality of accessory components; and a plurality of electronically controlled coupling devices associated with the plurality of accessory components. In one or more embodiments, each electronically controlled coupling device can be configured to selectively couple a corresponding accessory component to the force transmitted by the transmission.

In accordance with another aspect of the present disclosure, a vehicle is provided. The vehicle includes a chassis, an engine carried by the chassis, a vehicle body carried by the chassis and including a compartment positioned below one of a vehicle door and a sleeper cab, and an accessory drive unit positioned in the compartment.

In some embodiments, the accessory drive unit includes a power storage source, a plurality of vehicle accessory components each having an driven input shaft, an electric motor variably coupled to the power storage source, and a transmission coupled between the electric motor and the driven input shafts of the plurality of vehicle accessories. In some embodiments, the transmission can be configured to transfer the output of the electric motor to the plurality of accessory components. The accessory drive unit also includes a plurality of electronically controlled coupling devices coupled between the transmission and the driven input shafts. In one or more embodiments, each electronically controlled coupling device is configured to decouple a corresponding vehicle accessory from the force transmitted by the transmission upon receipt of a signal. The accessory drive unit further includes a controller coupled to the plurality of electronically controlled coupling devices. In one or more embodiments, the controller can be configured to control the operation of the plurality of electronically controlled coupling devices.

In accordance with another aspect of the present disclosure, an electrical accessory drive unit is provided. The unit includes a plurality of vehicle accessories, each including a driven input shaft, an electric motor, a transmission coupled between the electric motor and the driven input shafts of the plurality of vehicle accessories in order to transfer the output of the electric motor to the plurality of accessory components, and a plurality of electronically controlled coupling devices coupled between the transmission and the driven input shafts. In some embodiments, each electronically controlled coupling device can be configured to selectively couple a corresponding vehicle accessory to the force transmitted by the transmission upon receipt of a signal.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
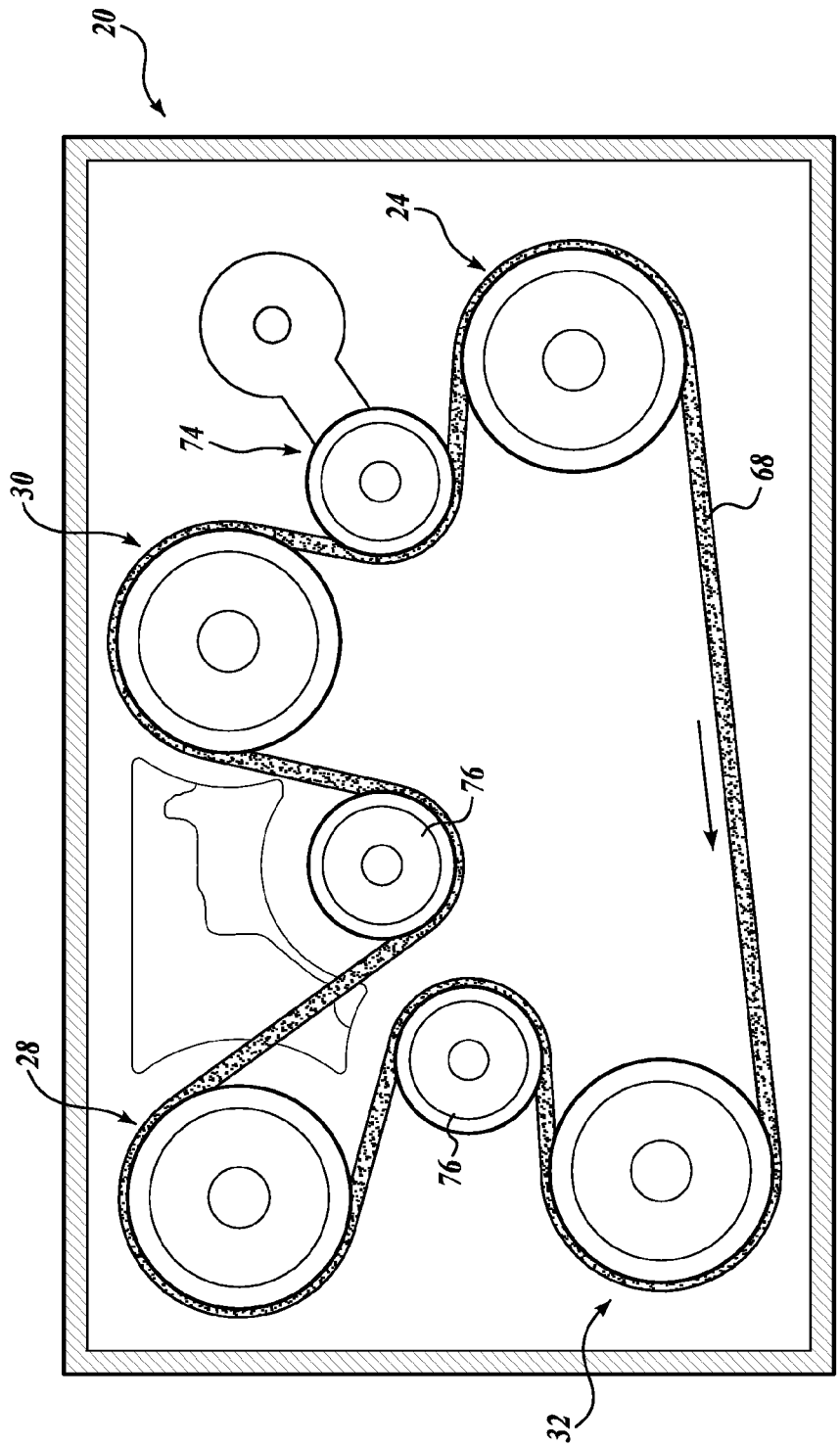
FIG. 1 is a schematic diagram of the front view of an electrified engine accessory drive (EEAD) system in accordance with aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

Prior to discussing the details of various aspects of the present disclosure, it should be understood that the following description includes one ore more sections that are presented largely in terms of logic and operations that may be performed by conventional electronic components. These electronic components may be grouped in a single location or distributed over a wide area, and can generally include processors, memory, input/output circuitry, etc. It will be appreciated by one skilled in the art that the logic described herein may be implemented in a variety of configurations, including but not limited to, hardware, software, and combinations thereof. In circumstances were the components are distributed, the components are accessible to each other via communication links.

The following description sets forth one or more examples of an electrified engine accessory drive (EEAD) system that replaces the front engine accessory drive (FEAD) components (e.g., a/c compressor, air brake compressor; power steering pump, etc.) on vehicles, such as heavy duty trucks. Using such an EEAD system aims to reduce parasitic losses induced on a conventional engine by the front engine accessory drive (FEAD) while providing additional benefits, such as engine off vehicle and/or system operation. It will be appreciated that the EEAD systems of the present disclosure may also be used in lieu of rear-end accessory drives and other accessory drives powering multiple accessories from a common driveshaft and is not attended to be limited to replacing just FEAD applications.

Referring now to FIGS. 1-4, there is shown an example of an electrified engine accessory drive (EEAD) system, generally designated 20, in accordance with aspects of the present disclosure. In use, the EEAD system 20 replaces, for example, the front engine accessory drive (FEAD) components (e.g., a/c compressor, brakes air compressor; power steering pump, etc.) on a suitable vehicle, such as a medium or heavy duty truck. As will be described in more detail below, the EEAD system 20 in some embodiments may be configured as a unit that can be mounted in a located on the vehicle remote from the prime mover of the vehicle, which can be in the form of an internal combustion engine in some embodiments. Such remote locations may include but are not limited to a toolbox enclosure, battery bay, storage enclosure, trunk, etc.

As best shown in the FIG. 1, the EEAD system 20 includes an electric drive motor 24 that drives a plurality of vehicle accessories 28-32 via a transmission 28. Examples of the accessories include but are not limited to an air conditioning compressor 28, an air compressor 30 for air brakes, etc., a power steering pump 32, etc. Other accessories may be additionally or alternatively included, such as an alternator, an auxiliary pump, a power take-off (PTO), etc. Of course, the number, type, and location of various vehicle accessories will vary depending upon the particular application and implementation. As will be described in more detail below, the EEAD system 20 also includes a controllable coupling mechanism 36 (See FIGS. 2 and 3), such as an electromagnetic clutch, associated with each accessory 28-32. In use, each coupling mechanism 36 can be controlled for selective coupling/decoupling so that each accessory can be operated independent of the others.

Figure 2:
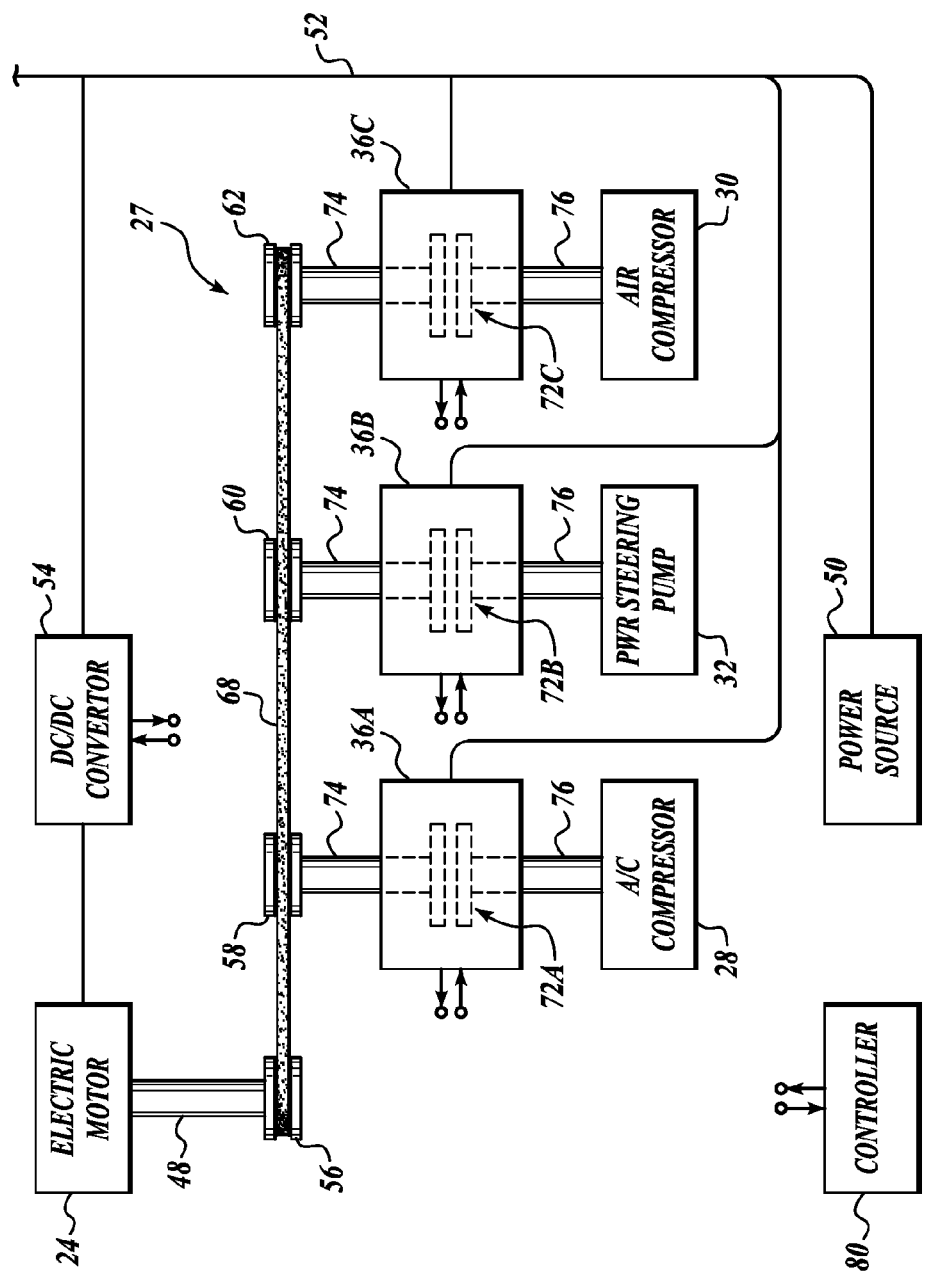
FIG. 2 is a block diagram of one example of an electrified engine accessory drive (EEAD) system in accordance with aspects of the present disclosure.

Turning now to 2 and 3, the components of the EEAD system 20 will be described in more detail. FIG. 2 is a schematic diagram of one example of the EEAD system 20. As best shown in FIG. 2, the electric drive motor 24 includes an output shaft 48. In one embodiment, the electric motor 24 is a 16 hp motor configured to provide rpm's in the range of 1000-3000. The electric drive motor 24 receives power from a power source 50 under control of a controller 80, as will be described in more detail below. In some embodiments, the power source 50 can be a generator or a power storage source, for example, a battery, a bank of batteries, a fuel cell, an ultra-capacitor, etc., or combinations thereof. In one embodiment, the power source supplies 48-340 VDC to the electric drive motor 24. In one embodiment, the power source is electrically connected to the electric motor via a high voltage DC Bus 52 and a variable output DC to DC converter 54, which outputs a variable DC voltage based on instructions from the controller 80.

The output shaft 48 is coupled to the transmission 28. In the embodiment shown, the transmission includes a pulley 56 fixed for rotation with the output shaft 48. The transmission 28 also includes a pulley associated with each accessory, such as pulleys 58, 60, 62. The transmission 28 further includes a torque transmitting element in the form of a common drive belt 68. In the embodiment illustrated, the drive belt 68 passes around each pulley 56, 58, 60, 62 associated with the drive motor and the vehicle accessories. Additional components for the transmission of force from the electric drive motor 24 may also be employed, including a belt tensioner 74 and one or more idler pulleys 76, as best shown in FIG. 1. In some embodiments, the drive belt 68 may include one or more grooves, teeth, or similar devices that cooperate with each pulley or other drive element to reduce slipping. Depending on the particular application, the pulleys may vary in sizes in order to increase or decrease the speed thereof. Those of ordinary skill in the art will recognize that embodiments of the present disclosure are independent of the particular type of transmission used to drive or connect the accessories to the electric drive motor 24. Therefore, other types of transmissions, including gear transmissions, may be practiced by some embodiments of the present disclosure.

Each pulley is coupled to an associated accessory through a coupling mechanism 36. In the embodiment of FIG. 2, each coupling mechanism 36 includes an electrically controllable coupling device 72. For example, in some embodiments of the present disclosure, the controllable coupling device 72 may be implemented by an electro-magnetic clutch. Other controllable coupling devices having the ability to engage/disengage via control signals (e.g., voltages, etc.) may be practiced with embodiments of the present disclosure. In any case, the electrically controllable coupling device 72 includes a driving member 74 connected to the pulley 58 and a driven member 76 coupled for rotation with an input shaft of an associated accessory, such as accessories 28-32. In the embodiment shown, the driven member 76 is coupled to the driving member 74 by a controllable magnetic field so that the driven member 76 rotates with the driving member 74 when desired. It will be appreciated that the input shafts of the associated accessories directly or indirectly drive the pump, compressor, etc., of the associated accessory.

The coupling mechanisms 36 are normally disengaged, and may be implemented in several embodiments with electromagnets. A normally disengaged device as schematically illustrated in FIG. 2 does not have a voltage applied in the disengaged state, and thus, no magnetic field is present to couple the driving and driven members. In order to couple the driving and driven member to obtain an "engaged state", a voltage is applied to the electromagnet. Thus, the conditional supply of power to the electromagnets of the coupling mechanisms changes the states of the devices between an engaged state and a disengaged state. While the coupling device is shown and described as a normally disengaged device, coupling mechanisms configured to be normally engaged can be practiced with embodiments of the present disclosures. Such configurations of normally engaged coupling mechanisms using magnetic fields are well know in the art and are not explained in detail here for brevity of the disclosure.

In the embodiment shown, the coupling mechanisms 36 receive a supply of power from the power source 50 via the DC Bus 52. In some embodiments, a step down transformer may be employed to provide low voltages to the coupling mechanisms 36. As will be described in greater detail herein, the controller 80 transmits suitable control signals to the coupling mechanisms 36 in order to selectively supply power from the power source 50 to the to electrically controllable coupling devices 72. In one embodiment, the control signals operate a switching device in order to either supply or cut-off power to the associated device 72.

Figure 3:
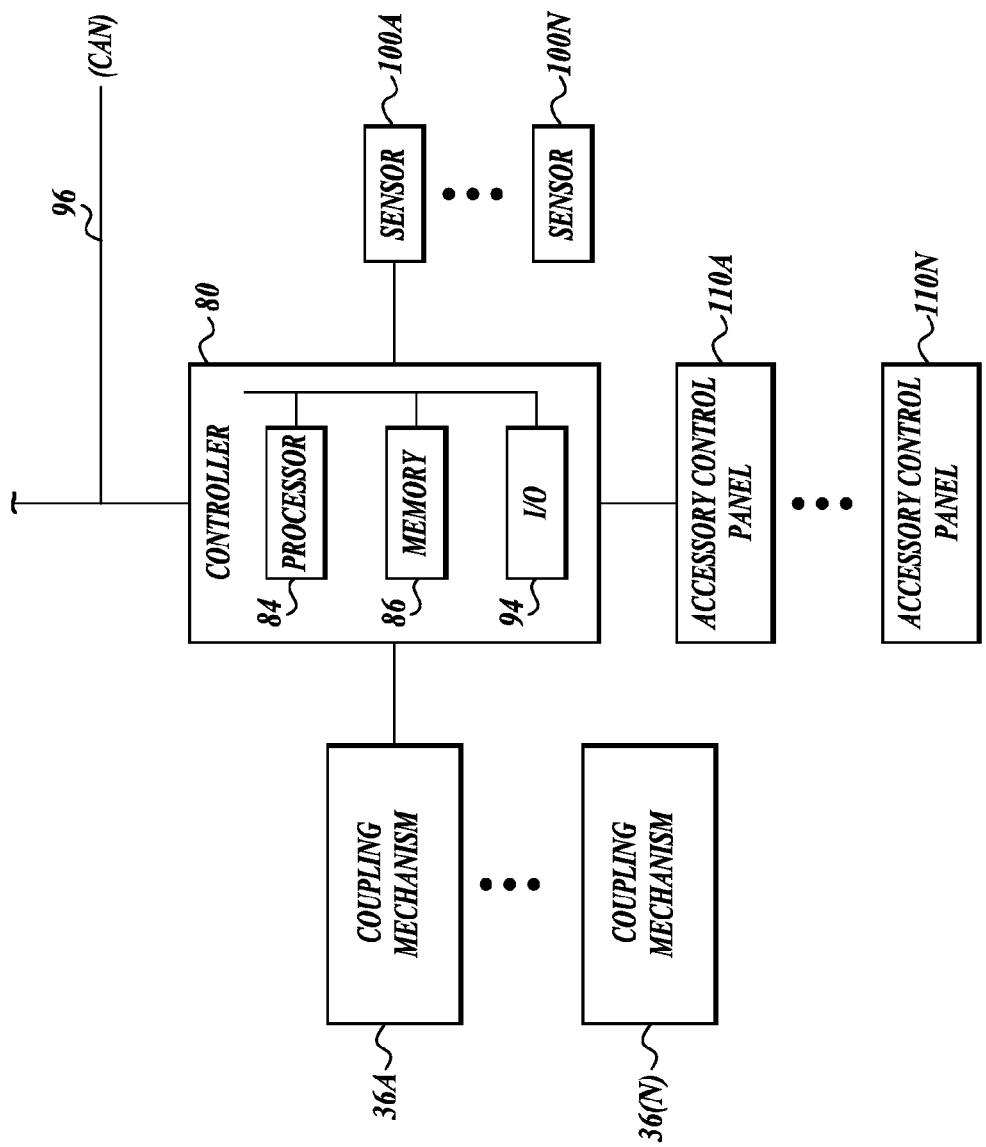
FIG. 3 is a block diagram of one example of controller suitable for use with the electrified engine accessory drive (EEAD) system of FIG. 3.

As briefly mentioned above, the supply of power to one or more controllable coupling devices 72, to electric motor 24, etc., is controlled by a controller 80. In some embodiments, the controller 80 includes a processor 84 and memory 86, as best shown in FIG. 3. The memory 86 may include computer readable storage media having volatile and nonvolatile storage in read-only memory (ROM), random-access memory (RAM), and keep-alive memory (KAM), for example. The KAM may be used to store various operating variables while the processor 84 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data. The data includes executable instructions, used by processor 84, in controlling the operation of the electric motors and one or more of vehicle accessories via the coupling mechanisms 36. In other embodiments, some of the data may represent executable instructions, used by processor 84, to control the prime mover, such as the engine, of the vehicle into which the engine is mounted. As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. In one embodiment, the processor 84 executes instructions stored in memory 86 to selectively supply power to one or more electro-magnetic coupling devices and to supply a variable DC voltage to the electric motor 24 via a motor controller (not shown) or other device level circuitry.

Still referring to FIG. 3, the processor 84 communicates with various sensors 100 directly or indirectly via an input/output (I/O) interface 94 and suitable communication links. The interface 94 may be implemented as a single integrated interface that provides various raw data or signal conditioning, processing, and/or conversion, short-circuit protection, and/or the like. Alternatively, one or more dedicated hardware or firmware chips may be used to condition and process particular signals before being supplied to the processor 84. In some embodiments, the signals transmitted from the interface 94 may be suitable digital or analog signals to control the operation of a switching device of the devices 82. In other embodiments, the signals transmitted from the interface 94 may be suitable voltages to directly control the devices 72.

The controller 80 may be a designated controller of the system 20 or may be part of another on board controller, such as an engine control module (ECM). The controller 80 may also be connected to other vehicle controllers via a CAN 96. In some embodiments, the controller 80 may receive data from the system sensors via the CAN 96. Embodiments of the CAN 96 may be implemented using the SAE J1939 protocol, among others.

Sensors 100 may also be provided and used to control engagement and disengagement of various vehicle accessories. For example, the sensors 100 may include a steering or wheel angle sensor to determine whether to operate the power steering pump, an air pressure sensor to determine whether the compressed air reservoirs are in need of filling by operation of the air compressor for proper operation of such vehicle components as brakes, etc., ambient air temperature sensors to determine whether to operate the air conditioning compressor, etc. In some embodiments, the controller 80 may receive other control signals, for example, from accessory control panels 110 for operating one or more accessories of the EEAD system. In some embodiments, the system specific controls include but are not limited to A/C operation, pneumatic or hydraulic actuation of landing gear, winches, among others.

Figure 4:
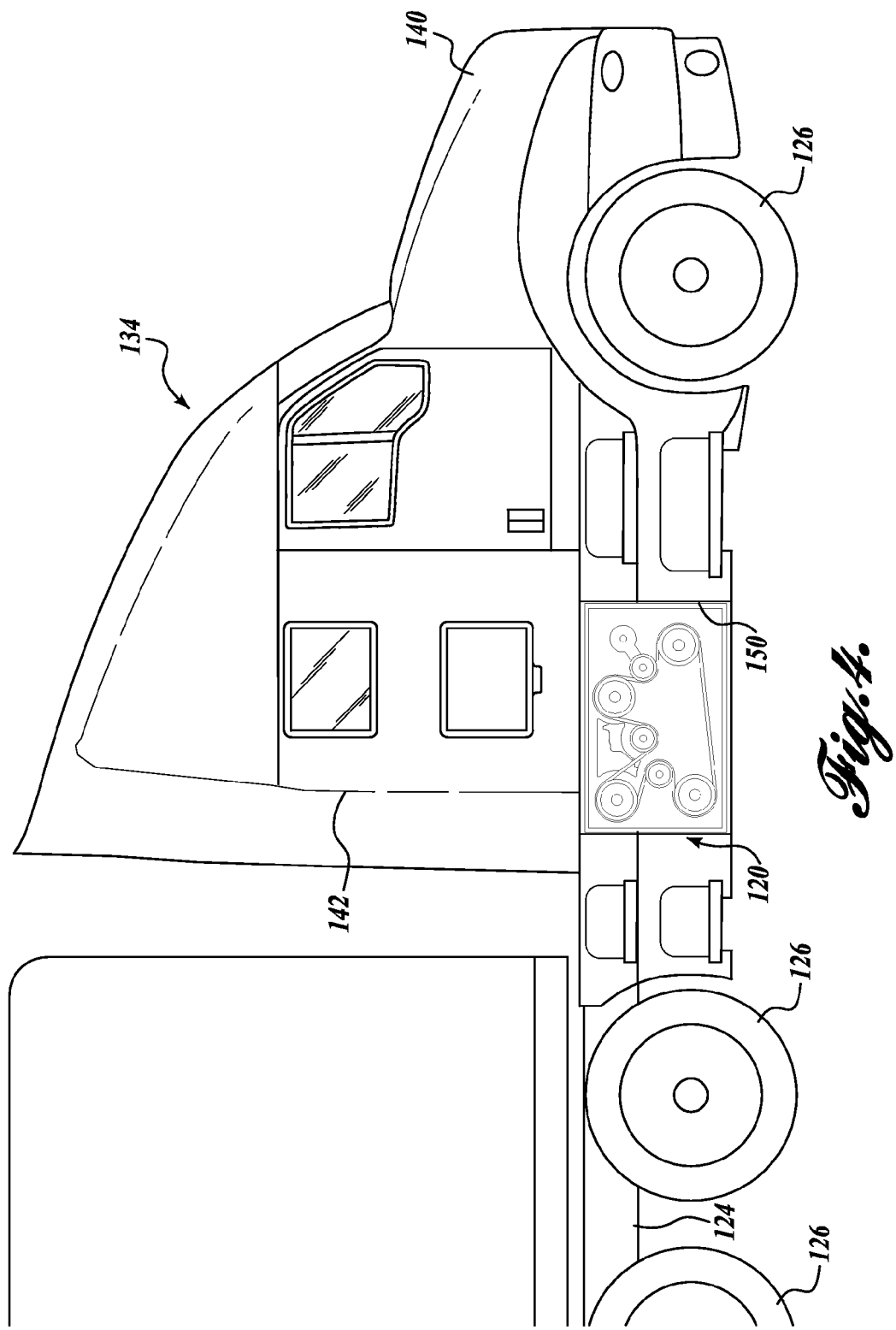
FIG. 4 is a schematic illustration of one example of a semi-tractor that may employ an electrified engine accessory drive (EEAD) system.

In accordance with aspects of the present disclosure, several components of the system 20 may be assembled into a unit 120 and positioned remote from the prime mover of the vehicle. FIG. 4 is a schematic illustration of one example of a semi-tractor that may employ the system 20 or unit 120. As best shown in FIG. 4, the semi-tractor comprises a chassis 124 that is supported by wheels 126 connected thereto via conventional suspension assemblies (not shown). A conventional cab assembly 134 is supportably mounted on the chassis 124. The cab assembly 134 includes a front end 140 that generally houses an internal combustion engine (hidden in FIG. 4) that propels the tractor and a rear end 142 that defines a generally vertically oriented rear wall (not shown). In the embodiment shown, the cab assembly 134 includes a compartment 150 positioned below one of a vehicle door and/or the sleeper cab (shown in FIG. 4 as being below the sleeper cab). The engine of the semi-tractor is coupled via a drive shaft and axle to at least a pair of driven wheels 126 as generally known in the art. As best shown in FIG. 4, the unit 120 is mounted within the compartment 150 (a compartment door, panel or other protective structure is omitted in FIG. 4).

In some embodiments, the unit 120 may also include the power source 50. In other embodiments, the power source 50 employed by the unit 120 may be located elsewhere in the vehicle and may be used to power other systems of the vehicle. For example, in some embodiments, the power source may include an alternator driven by the engine or a generator discrete from the engine. In other embodiments, the power source is one or more rechargeable batteries, one or more ultra-capacitors, a fuel cell, combinations thereof, etc. In embodiments that employ a power source that is discrete or otherwise operates independent of the prime mover, such as the engine, the system 20 or unit 120 may be employed during "engine-off" conditions, such as during mandatory vehicle rest stops, during idle conditions at stop lights, etc. (e.g., in vehicles so equipped with stop-start engine systems), low speed driving, or other vehicle operations that do not require operation of the prime mover (e.g., in hybrid vehicles, etc).

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A vehicle, comprising:
   a driveline including a drive shaft and at least one driven wheel;
   a prime mover configured to provide power to the driveline to provide motive force to the vehicle;
   a plurality of vehicle accessory components; and
   an accessory drive unit disposed a spaced distance from the prime mover and discrete therefrom, the accessory drive unit comprising:
      an electric motor;
      a power storage source;
      a variable output converter coupled in series between the electric motor and the power storage source, the variable output converter configured to receive an input voltage from the power storage source and to provide a variable output voltage to the electric motor;
      a transmission coupled between the electric motor and the plurality of accessory components in order to transfer the output of the electric motor to the plurality of accessory components; and
      a plurality of coupling devices, wherein each of the plurality of coupling devices is associated with one of the plurality of accessory components; and
      a controller configured to control each of the plurality of coupling devices to selectively couple each of the plurality of accessory components to force transmitted by the transmission, wherein the controller is further configured to control the variable output converter to set the variable output voltage from the variable output converter to the electric motor.

2. The vehicle of claim 1, wherein the coupling devices are electromagnetic clutches.

3. The vehicle of claim 1, wherein the plurality of vehicle accessory components are selected from a power take off (PTO), an air conditioner compressor, an air compressor, a power steering pump, a fan, and an alternator.

4. The vehicle of claim 1, further comprising a cab assembly, wherein the cab assembly includes a compartment positioned below one of a vehicle door and a sleeper cab and configured to house the accessory drive unit.

5. The vehicle of claim 1, wherein the accessory drive unit is operable independent of the prime mover.

6. The vehicle of claim 1, wherein one of the plurality of vehicle accessory components is an air conditioning compressor associated with an air conditioner, wherein the accessory drive unit is operable in an off state of the prime mover.

7. The vehicle of claim 1, wherein the power storage source is coupled with and configured to supply power to each of the plurality of vehicle accessory components.

8. The vehicle of claim 7, wherein the accessory drive unit further comprises one or more step down transformers coupled between the power storage source and the plurality of coupling devices, the one or more step down transformers configured to receive the input voltage from the power storage source and to provide a lower voltage to each of the plurality of coupling devices.

9. A vehicle, comprising:
   a chassis;
   an engine carried by the chassis;
   a vehicle body carried by the chassis and including a compartment positioned below one of a vehicle door and a sleeper cab; and
   an accessory drive unit positioned in the compartment, the accessory drive unit comprising:
      a power storage source;
      a plurality of vehicle accessory components each having a driven input shaft;
      an electric motor variably coupled to the power storage source;
      a variable output converter coupled in series between the electric motor and the power storage source, the variable output converter configured to receive an input voltage from the power storage source and to provide a variable output voltage to the electric motor;
      a transmission coupled between the electric motor and the driven input shafts of the plurality of vehicle accessory components, the transmission configured to transfer an output of the electric motor to the plurality of accessory components; and
      a plurality of coupling devices coupled between the transmission and the driven input shafts; and
      a controller configured to control each of the plurality of coupling devices to selectively couple and decouple each of the plurality of vehicle accessory components from force transmitted by the transmission, wherein the controller is further configured to control the variable output converter to set the variable output voltage from the variable output converter to the electric motor.

10. The vehicle of claim 9, wherein the controller is configured to generate a signal to control each of the plurality of coupling devices.

11. The vehicle of claim 9, wherein the accessory drive unit is operable independent of the engine.

12. The vehicle of claim 9, wherein the coupling devices are electromagnetic clutches.

13. The vehicle of claim 9, wherein the plurality of vehicle accessory components are selected from a power take off (PTO), an air conditioner compressor, an air compressor, a power steering pump, a fan, and an alternator.

14. The vehicle of claim 9, wherein the power storage source is coupled with and configured to supply power to each of the plurality of vehicle accessory components.

15. The vehicle of claim 14, wherein the accessory drive unit further comprises one or more step down transformers coupled between the power storage source and the plurality of coupling devices, the one or more step down transformers configured to receive the input voltage from the power storage source and to provide a lower voltage to each of the plurality of coupling devices.

16. An electrical accessory drive unit, comprising:
   a plurality of vehicle accessories, each including a driven input shaft;
   an electric motor, wherein the electric motor is separate from a prime mover of a vehicle that is configured to provide motive force to the vehicle;
   a power storage source;
   a variable output converter coupled in series between the electric motor and the power storage source, the variable output converter configured to receive an input voltage from the power storage source and to provide a variable output voltage to the electric motor;

a transmission coupled between the electric motor and the driven input shafts of the plurality of vehicle accessories in order to transfer an output of the electric motor to the plurality of vehicle accessories;

a plurality of coupling devices, wherein each of the plurality of coupling devices is coupled between the transmission and one of the driven input shafts; and a controller configured to control each of the plurality of coupling devices to selectively couple each of the plurality of vehicle accessories to force transmitted by the transmission, wherein the controller is further configured to control the variable output converter to set the variable output voltage from the variable output converter to the electric motor.

17. The electrical accessory drive unit of claim 16, wherein the coupling devices are electromagnetic clutches.

18. The electrical accessory drive unit of claim 16, wherein the power storage source is coupled with and configured to supply power to each of the plurality of coupling devices.

19. The electrical accessory drive unit of claim 18, further comprising one or more step down transformers coupled between the power storage source and the plurality of coupling devices, the one or more step down transformers configured to receive the input voltage from the power storage source and to provide a lower voltage to each of the plurality of coupling devices.

20. The electrical accessory drive unit of claim 16, wherein the controller generates the signal.

* * * * *